No. 766,428.

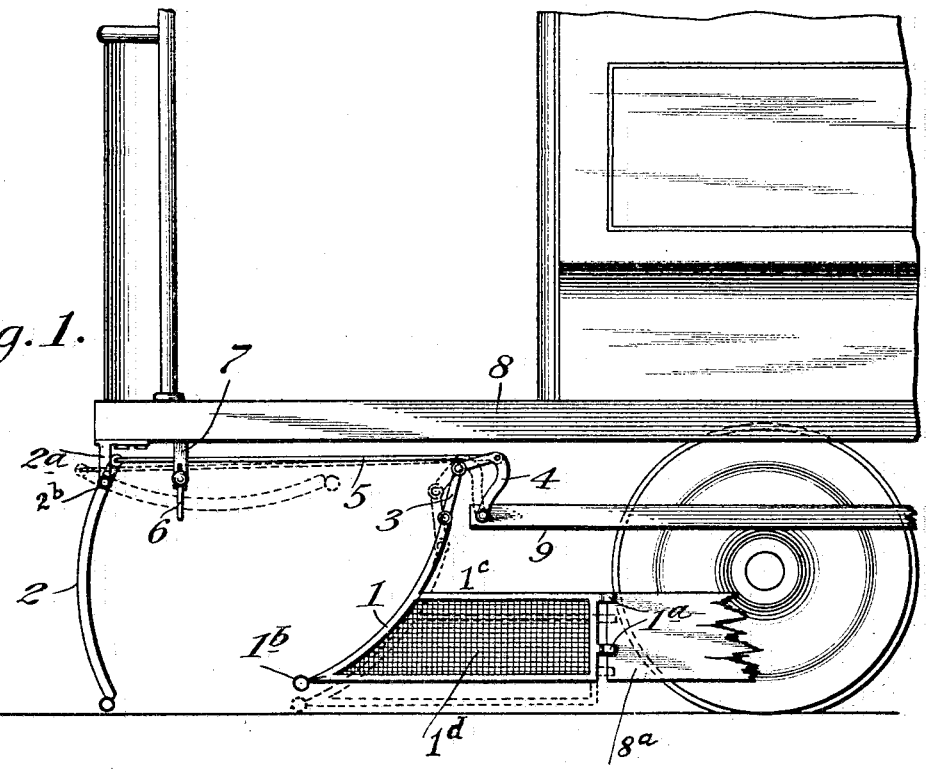

Patented August 2, 1904.

UNITED STATES PATENT OFFICE.

FRANZ CSANITZ, OF VIENNA, AUSTRIA-HUNGARY.

CAR-FENDER.

SPECIFICATION forming part of Letters Patent No. 766,428, dated August 2, 1904.

Application filed March 26, 1904. Serial No. 200,107. (No model.)

*To all whom it may concern:*

Be it known that I, FRANZ CSANITZ, a resident of Vienna, Austria-Hungary, have invented certain new and useful Improvements in Car-Fenders, of which the following is a specification.

My invention relates to improvements in car-fenders particularly adapted to electrically or self propelled cars and vehicles, and has for its object to provide a fender that normally will be raised clear from the ground for a comparatively considerable height and whereupon when a person or other obstruction is met the fender will be automatically lowered substantially into contact with the ground to prevent the person from passing under the car or vehicle.

To these and other ends, which will hereinafter appear, the invention consists of the novel features of improvement and combination and arrangement of parts hereinafter described and then pointed out in the appended claim.

Reference is to be had to the accompanying drawings, forming part hereof, wherein—

Figure 1 is a side elevation of a portion of a car or vehicle provided with my invention. Fig. 2 is a plan view of the fender detached from the car. Fig. 3 is a detail of a catch for holding the shield or fender-guard raised. Fig. 4 is a detail view of the lower front edge of the fender, and Fig. 5 is a detail view of a modified form of device for actuating the fender.

Similar numerals of reference indicate corresponding parts in the several views.

In the accompanying drawings the numeral 1 indicates generally the fender proper, which preferably is of such form as to act in the nature of a scoop to receive a person or other obstruction. In the form shown the fender has side frame portions (indicated at $1^c$) provided with wire-netting or the like $1^d$ and wire-netting or the like $1^e$ between the sides and extending along substantially parallel with the ground, the forward front edge of the side bars of the netting being curved downwardly and forwardly in scoop-like shape, and at the forward edge the fender 1 is provided with a buffer or edging $1^b$, which is preferably of resilient material, such as leather or rubber fabric, shown in tubular form, provided with webs $1^f$, secured in sockets in the edge of the frame. (See Fig. 4.) This provides a resilient buffer to equalize inequalities in the road-bed and to prevent injury to a fallen person coming in contact with the fender. The fender is supported upon the car or vehicle so that its forward edge $1^b$ may rise and fall, and means are provided for normally maintaining the fender at a distance above the surface of the road-bed and for permitting the fender to descend to a point substantially in contact with the road-bed when an obstruction is met. To this end I have shown the fender provided with forked end portions $1^a$, guided by bars $8^a$, carried by the car 8, to give freedom of up-and-down motion to the fender, although, if preferred, the fender could be pivotally connected with the car for the same purpose. The forward or free end of the fender is supported from the car or vehicle, as upon a beam 9, by means of levers or bell-cranks, as follows: A link 3, pivotally connected with the fender, is also pivotally connected with a lever or crank 4, pivoted upon the beam 9 and connected by a rod 5 with a shield or guard 2, that is pivotally supported at the forward end of the car or vehicle, as upon a bracket $2^a$, and adapted to hang downwardly, as in full lines in Fig. 2, in front of the fender. The arrangement of the parts is such that when the shield or guard 2 hangs down, as in full lines in Fig. 1, the lever or crank 4 will be pushed back, and thereby the fender will be raised from the ground, and when the shield or fender-guard 2 strikes a person or other obstruction it will be pushed back under the vehicle or car and by turning on its pivot $2^b$ will draw the lever 4 forward, which will push down the fender into substantial contact with the road-bed, all as indicated in dotted lines in Fig. 1.

At 6 is indicated a latch or catch, shown pivotally supported from the vehicle by a bracket 7 in such position as to engage the shield or guard 2 when the latter is pushed under the car, so as to hold the same elevated and keep the fender down. The shield or guard 2 may be in the form of a frame filled in with wire-netting or the like to act as a complete obstruction, and acts in the nature of an auxiliary actuating-fender, because a person will be struck by the same before the fender proper reaches him.

In Fig. 5 the means for operating the fender is shown in the form of a bell-crank 10, pivotally supported by the beam 9 and connected by a link 11 with the fender 1 and at its upper end connected with the rod 5, which when connected with the shield or guard 2, as shown in Fig. 1, acts in the same manner as before described to lower the fender when the shield or guard 2 meets an obstruction.

While I have shown the devices for supporting and operating the fender on one side of the car, it will be understood that similar devices will preferably be arranged on both sides of the car and both sets of devices connected with the shield or fender-guard 2.

The details of construction may be varied without departing from the spirit of the invention, the devices shown and described being simply a simple embodiment of my invention.

Having described my invention, what I claim, and desire to secure by Letters Patent, is—

In combination with a car-fender normally held at an interval above the road-bed, the shield 2 pivotally suspended from the car and situated in front of the said fender, the bell-crank lever 4 pivoted to said car and the link 3 and rod 5 respectively connecting the said lever to the fender and shield, the said devices permitting the shield to swing freely backward on contact with an obstruction and causing the fender to be lowered to the ground substantially as set forth.

FRANZ CSANITZ.

Witnesses:
 ALVESTO S. HOGUE,
 AUGUST FUGGER.